United States Patent
Li

(10) Patent No.: US 8,106,645 B2
(45) Date of Patent: Jan. 31, 2012

(54) POWER SAVING SYSTEM FOR HOUSEHOLD ELECTRIC APPLIANCE

(75) Inventor: Wing Chung Li, Hong Kong (HK)

(73) Assignee: ARCFL Technology Limited, Hong Kong (HK)

( * ) Notice: Subject to any disclaimer, the term of this patent is extended or adjusted under 35 U.S.C. 154(b) by 452 days.

(21) Appl. No.: 12/422,310

(22) Filed: Apr. 13, 2009

(65) Prior Publication Data

US 2010/0259243 A1    Oct. 14, 2010

(51) Int. Cl.
*H02J 3/12* (2006.01)
(52) U.S. Cl. .................................................... 323/353
(58) Field of Classification Search .......... 323/351–353; 307/45, 46; 366/206, 314, 601; 99/492, 99/337, 347
See application file for complete search history.

(56) References Cited

U.S. PATENT DOCUMENTS

| | | | |
|---|---|---|---|
| 6,397,735 B1 | 6/2002 | Wong | |
| 6,402,365 B1 | 6/2002 | Wong | |
| 7,119,658 B2* | 10/2006 | Stilp | 340/5.61 |
| 2003/0157955 A1* | 8/2003 | Jarvisalo et al. | 455/522 |
| 2008/0315685 A1 | 12/2008 | Mandalakas et al. | |
| 2010/0246648 A1* | 9/2010 | Rocamora et al. | 375/222 |

FOREIGN PATENT DOCUMENTS

| | | |
|---|---|---|
| JP | 1114370 | 5/1989 |
| JP | 4198648 | 7/1992 |
| JP | 10117475 | 5/1998 |
| JP | 2000209777 | 7/2000 |

OTHER PUBLICATIONS

Examination Report of European Patent Application No. 10157593.4.

* cited by examiner

*Primary Examiner* — Adolf Berhane

(57) ABSTRACT

A power saving system for a household electric appliance includes a signal processing unit, a step down network having an adjustable impedance for stepping down an input voltage, and an impedance control switch electrically connected with the step down network and configured for controlling the impedance of the step down network. The signal processing unit is electrically connected to impedance control switch and configured to monitor the working condition of the household electric appliance, calculate the current demanded by the household electric appliance at a next moment, and transmit a signal to the impedance control switch so as to control the impedance control switch to adjust the impedance of the step down network according to the calculation.

14 Claims, 3 Drawing Sheets

POWER SAVING SYSTEM FOR HOUSEHOLD ELECTRIC APPLIANCE

FIELD OF THE PATENT APPLICATION

The present invention generally relates to power management technology for household electric appliances, and more particularly, to a microprocessor-based control system for saving power consumption of a household electric appliance.

BACKGROUND

A household electric appliance having an electronic control system normally needs a stable DC power supply. The DC power is often directly converted from an AC power source through a power conversion device, such as a low frequency linear transformer, a switching mode power supply or a simple step down circuit. The electronic control system may need different amount of power under different working conditions and the power supply should be able to provide sufficient power to the control system all the time for the electronic control system to work properly. In a conventional technology, the power supply constantly outputs the maximum power that the control system possibly needs regardless of the actual working condition that the control system is under, which leads the power supply circuit to consume a great amount of power most of the time. Currently, some switch mode power supplies have made some improvement in this aspect, but the costs for such systems are still very high.

SUMMARY

The present patent application is directed to a power saving system for a household electric appliance. In one aspect, the power saving system includes a signal processing unit, a step down network having an adjustable impedance for stepping down an input voltage, and an impedance control switch electrically connected with the step down network and configured for controlling the impedance of the step down network. The signal processing unit is electrically connected to impedance control switch and configured to monitor the working condition of the household electric appliance, calculate the current demanded by the household electric appliance at a next moment, and transmit a signal to the impedance control switch so as to control the impedance control switch to adjust the impedance of the step down network according to the calculation.

In one embodiment, the step down network includes a voltage step down circuit and a conversion impedance control circuit. The voltage step down circuit is connected with the conversion impedance control circuit in parallel through the impedance control switch. The voltage step down circuit includes a first resistor, a second resistor and a first capacitor, the first resistor being connected with the first capacitor in parallel and connected with the second resistor in series. The conversion impedance control circuit includes a third resistor, a fourth resistor and a second capacitor, the third resistor being connected with the second capacitor in parallel and connected with the fourth resistor in series. The impedance control switch is configured to be turned on to connect the voltage step down circuit and the conversion impedance control circuit in parallel, and to be turned off to disconnect the voltage step down circuit and the conversion impedance control circuit, so as to adjust the impedance of the step down network.

In another embodiment, the impedance control switch is an electro-mechanical switch or a semiconductor power device.

In yet another embodiment, the signal processing unit is configured to set a switch point current value, judge whether the current demanded by the household electric appliance at the next moment is equal to or greater than the switch point current value, and adjust the impedance of the step down network according to the judgment. The signal processing unit is configured to turn on the impedance control switch so as to adjust the step down network to have a relatively low impedance when the current demanded by the household electric appliance at the next moment is equal to or greater than the switch point current value, and to turn off the switch so as to adjust the step down network to have a relatively high impedance when the current demanded by the household electric appliance at the next moment is less than the switch point current value.

In still another embodiment, the signal processing unit is configured to set a flag value after adjusting the impedance of the step down network, and to read the flag value before adjusting the impedance of the step down network.

In another aspect, the power saving system includes a signal processing unit; a step down network for stepping down an input voltage, the step down network having two current paths for providing current to the household electric appliance; and a current control switch electrically connected with the step down network and configured for selectively enabling the current paths in the step down network. The signal processing unit is electrically connected to current control switch and configured to monitor the working condition of the household electric appliance, calculate the current demanded by the household electric appliance at a next moment, and transmit a signal to the current control switch so that the current paths are selectively enabled by the current control switch according to the calculation.

In one embodiment, the step down network includes a first current path and a second current path. The first current path is connected with the second current path in parallel through the current control switch. The first current path includes a first resistor, a second resistor and a first capacitor, the first resistor being connected with the first capacitor in parallel and connected with the second resistor in series. The second current path includes a third resistor, a fourth resistor and a second capacitor, the third resistor being connected with the second capacitor in parallel and connected with the fourth resistor in series. The current control switch is configured to be turned on to enable both the first current path and the second current path to provide current to the household electric appliance, and to be turned off to enable only the first current path to provide current to the household electric appliance.

In another embodiment, the current control switch is an electro-mechanical switch or a semiconductor power device.

In yet another embodiment, the signal processing unit is configured to set a switch point current value, to judge whether the current demanded by the household electric appliance at the next moment is equal to or greater than the switch point current value, and to selectively enable the current paths according to the judgment. The signal processing unit is configured to turn on the current control switch so as to enable both of the two current paths when the current demanded by the household electric appliance at the next moment is equal to or greater than the switch point current value, and to turn off the switch so as to enable only the first current path when the current demanded by the household electric appliance at the next moment is less than the switch point current value.

In still another embodiment, the signal processing unit is configured to set a flag value after selectively enabling the current paths, and to read the flag value before selectively enabling the current paths.

In yet another aspect, the present patent application relates to a method for saving power for a household electric appliance. The method includes: providing a step down network for stepping down an input voltage, the step down network having an impedance that can be adjusted between a higher impedance value and a lower impedance value; setting a threshold current value; calculating the current demanded by the household electric appliance at a next moment; if the current demanded by the household electric appliance at a next moment is calculated to be equal to or greater than the threshold current value, setting the impedance of the step down network to be the lower impedance value; and if the current demanded by the household electric appliance at a next moment is calculated to be less than the threshold current value, setting the impedance of the step down network to be the higher impedance value.

In one embodiment, the method further includes setting a flag value after setting the impedance of the step down network and reading the flag value before setting the impedance of the step down network.

DETAILED DESCRIPTION

Reference will now be made in detail to embodiments of the power saving system for household electric appliance in the present patent application, examples of which are also provided in the following description. Exemplary embodiments of the power saving system for household electric appliance disclosed in the present patent application are described in detail, although it will be apparent to those skilled in the relevant art that some features that are not particularly important to an understanding of the power saving system for household electric appliance may not be shown for the sake of clarity.

Furthermore, it should be understood that the power saving system for household electric appliance disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
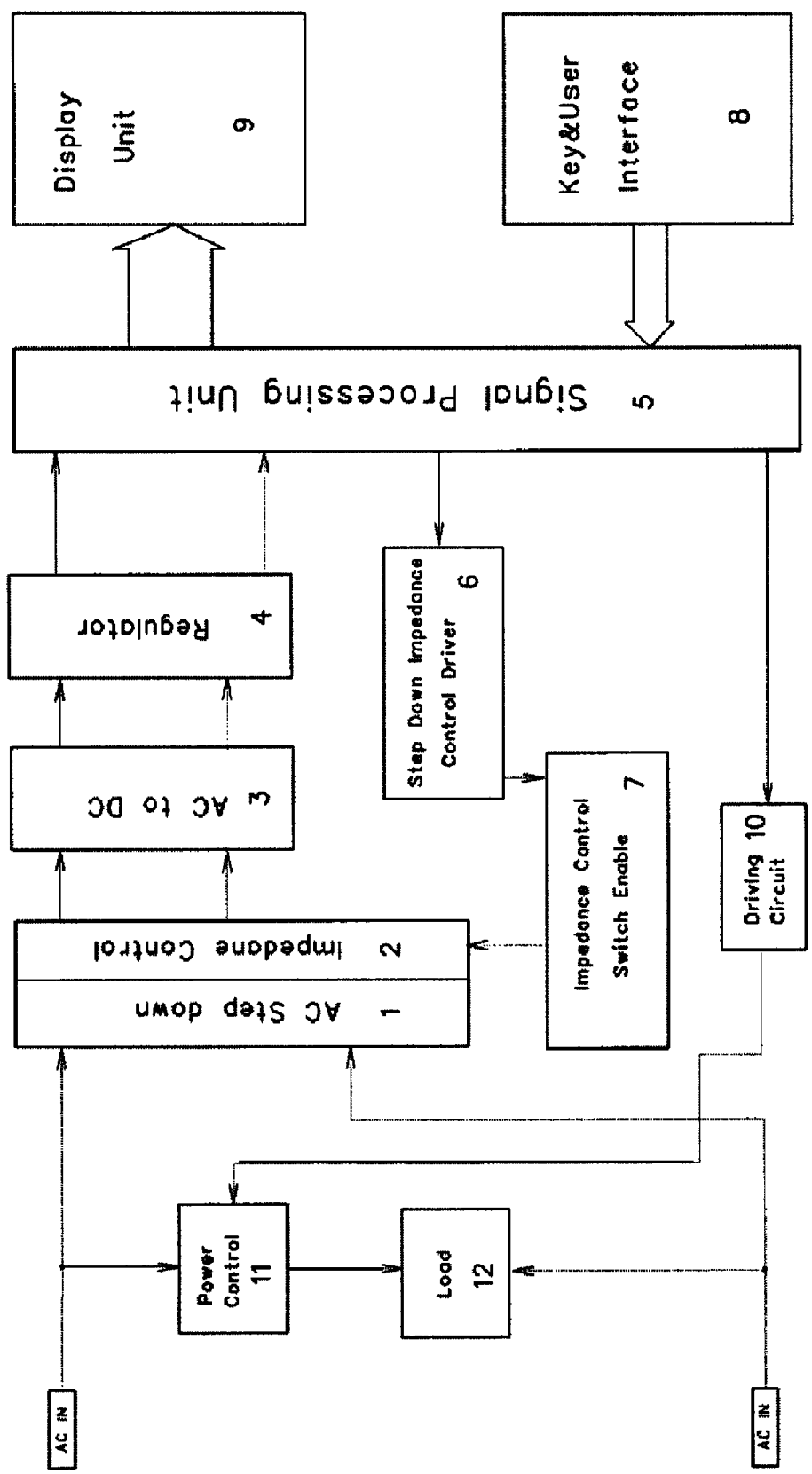
FIG. 1 is a functional block diagram of a power saving system for a household electric appliance according to an embodiment of the present patent application.

Referring to FIG. 1, an embodiment of the present patent application provides a power saving system for a household electric appliance. The power saving system includes an AC voltage step down circuit 1, a conversion impedance control circuit 2, a AC to DC rectifier circuit 3, a regulator circuit 4, a microprocessor based signal processing unit 5, a step down impedance control driver circuit 6 and an impedance control switch 7.

The AC voltage step down circuit 1 is connected with the conversion impedance control circuit 2 in parallel through the impedance control switch 7. The signal processing unit 5 includes a microprocessor, a programmable read-only memory (PROM) or an erasable programmable read-only memory (EPROM), a random access memory (RAM), buffers and circuitry for reception and manipulation of various inputs and outputs. The signal processing unit 5 is electrically connected with the impedance control switch 7. In this embodiment, the power conversion impedance, which is the impedance of a step down network formed by the AC voltage step down circuit 1 and the conversion impedance control circuit 2, can be adjusted at any time and the adjustment is controlled by the signal processing unit 5, which will be described in more detail hereafter.

Figure 2:
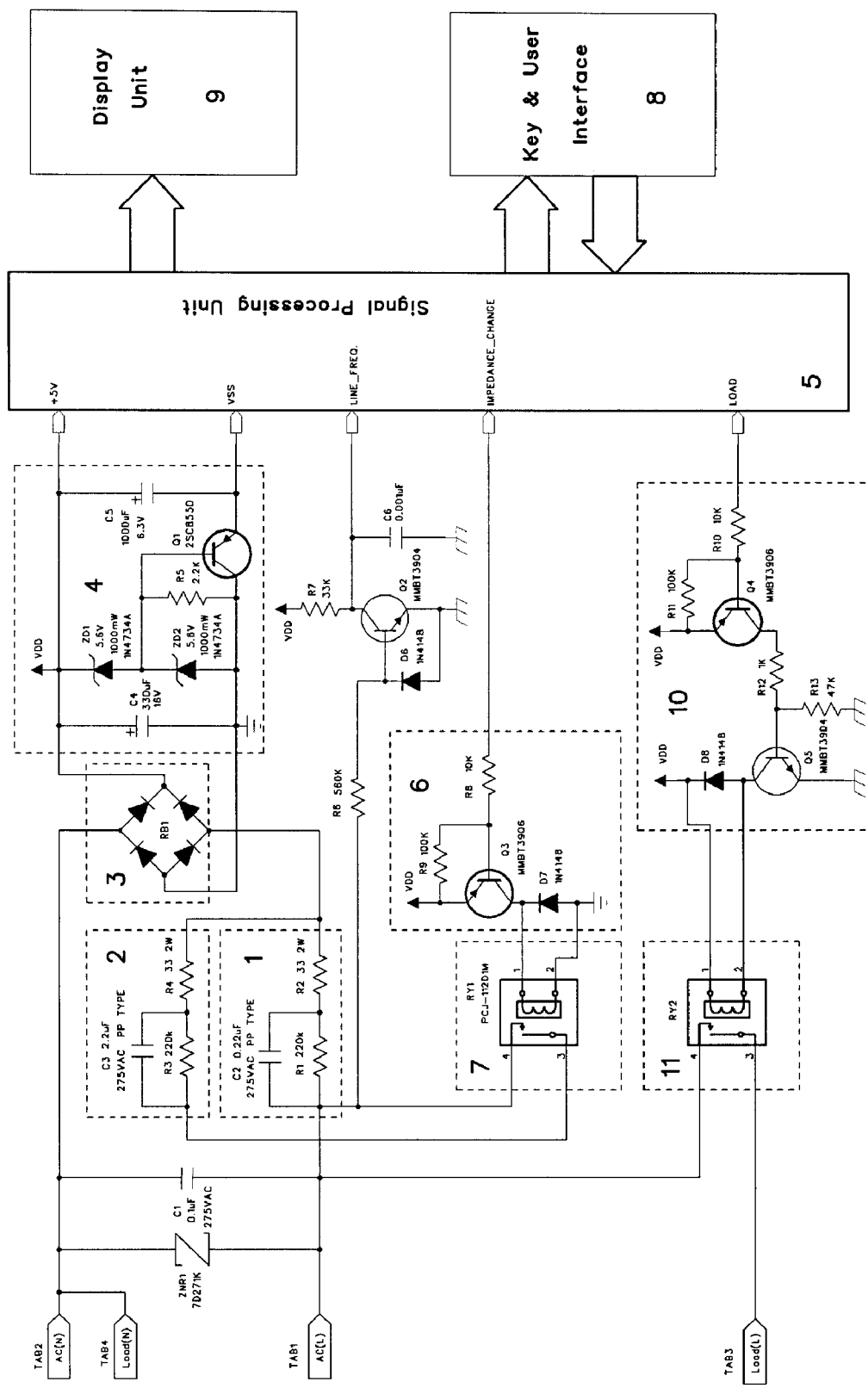
FIG. 2 is a circuit schematic diagram of the power saving system depicted in FIG. 1.

Referring to FIG. 2, which is a circuit schematic diagram of the power saving system provided by this embodiment illustrating the various capabilities and function components of the power saving system. An input AC current flows through the AC voltage step down circuit 1, which includes resistors $R_1$, $R_2$ and a capacitor $C_2$. The resistor $R_1$ is connected with the capacitor $C_2$ in parallel and connected with the resistor $R_2$ in series. The AC voltage step down circuit 1's impedance Z1 is:

$$Z_1 = Z_{R1} // Z_{C2} + Z_{R2}, \text{where:}$$

$$Z_{R1} = R_1,$$

$$Z_{R2} = R_2,$$

$$Z_{C2} = 1/(j\omega * C_2), \omega = 2\pi f, \text{where } f \text{ is the AC supply voltage frequency.}$$

Thus the impedance $Z_1$ can be given by the following equation:

$$Z_1 = R_1/(1+j\omega R_1 * C_2) + R_2$$

Referring to FIG. 2, an input AC voltage $V_{AC}$ is coupled to the AC to DC rectifier circuit 3 through the AC voltage step down circuit 1, and the supply AC current $I_{AC1}$ generated by this input AC voltage is given by following formula:

$$I_{AC1} = (V_{AC} - V_D)/Z_1, \text{where } V_D \text{ is the voltage across the rectifier circuit 3.}$$

The rectifier circuit 3 includes a rectifier diode array, a rectifier bridge or just a single rectifier diode. A DC voltage is output by the rectifier circuit 3 and further regulated by the regulator circuit 4 so as to provide a stable DC voltage $V_{DD}$ for the household electric appliance.

The above-mentioned power circuit provides a relatively small current $I_{AC1}$ for the household electric appliance to run. The microprocessor based signal processing unit 5 is configured to monitor the change of the working conditions of the household electric appliance, and calculate in real time how much power as well as supply current is needed by the system. If the signal processing unit 5 finds the operating current of the household electric appliance need to be increased to reach or exceed a threshold current value at the next moment, the signal processing unit 5 is configured to send a signal to the step down impedance control driver circuit 6 so that the driver circuit 6 turns on the impedance control switch 7 to lower the conversion impedance and thereby allow more current to be supplied to the household electric appliance. In this embodiment, the threshold current value is $I_{AC1}$.

The impedance control switch 7 can be an electro-mechanical switch, such as a relay or a semiconductor power device. Referring to FIG. 1 and FIG. 2, the impedance control switch 7 is electrically connected with the conversion impedance control circuit 2. When the impedance control switch 7 is turned on, the voltage step down circuit and the conversion impedance control circuit are connected in parallel. When the impedance control switch 7 is turned off, the voltage step down circuit and the conversion impedance control circuit are disconnected from each other.

Referring to FIG. 2, the conversion impedance control circuit 2 includes resistors $R_3$ and $R_4$, and a capacitor $C_3$. The resistor $R_3$ is connected with the capacitor $C_3$ in parallel and connected with the resistor $R_4$ in series. The conversion impedance control circuit 2 has an impedance $Z_2$ as shown below:

$Z_2 = Z_{R3} // Z_{C3} + Z_{R4}$, where:

$ZR3 = R3$, $ZR4 = R4$, $ZC3 = 1/(j\omega*C3), \omega = 2\pi f$, where $f$ is AC supply voltage frequency.

Thus, the impedance $Z_2$ can be given out by following equation:

$Z_2 = R_3/(1 + j\omega R_3 * C_3) + R_4$

Referring to FIG. 2, when the conversion impedance control circuit 2 is activated, it is connected in parallel to the AC voltage step down circuit 1. Now the input AC voltage is coupled to the rectifier circuit 3 through the conversion impedance control circuit 2 as well. An additional supply AC current $I_{AC2}$ generated by the input AC voltage is given by following formula:

$I_{AC2} = (V_{AC} - V_D)/Z_2$

So, under this condition the total supply AC current $I_{AC}$ is:

$$\begin{aligned} I_{AC} &= I_{AC1} + I_{AC2} \\ &= (V_{AC} - V_D)/Z_1 + (V_{AC} - V_D)/Z_2 \\ &= (V_{AC} - V_D)/(Z_1 Z_2/(Z_1 + Z_2)) \\ &= (V_{AC} - V_D)/(Z1 // Z2) \end{aligned}$$

It is shown that the total AC supply current increases from $I_{AC1}$ to $I_{AC} = I_{AC1} + I_{AC2}$. The effect can also be understood as when the AC to DC conversion impedance is adjusted from $Z_1$ to $(Z1//Z2)$, which is lower than $Z_1$, the total AC supply current thereby increases from $I_{AC1}$ to $I_{AC}$. As a result, the household electric appliance can be provided with an increased power for its proper operation. It is further understood here that the impedance control switch 7 is actually a current control switch for enabling or disabling current paths and controlling current supplied to the household electric appliance.

If, however, at another moment, the signal processing unit 5 finds the household electric appliance only needs a smaller amount of power, in fact so small that the household electric appliance only needs a supply current less than the threshold current value $I_{AC1}$, the signal processing unit 5 is configured to send a signal to the step down impedance control driver circuit 6 so that the step down impedance control driver circuit 6 turns off the impedance control switch 7 and thereby the conversion impedance control circuit 2 is deactivated and decoupled from the system. In that case, the AC supply current provided to the household electric appliance is decreased back to $I_{AC1}$ and the household electric appliance still works properly. The above-mentioned process runs all the time automatically when the household electric appliance is energized.

As the signal processing unit 5 in the power saving system monitors the working conditions of the household electric appliance, predicts the power consumption thereof in real time, and according to the actual power demand of the system adjusts the AC to DC conversion impedance and therefore the AC current supply, electric power is saved by the power saving system through eliminating waste of power during periods when less power is actually required by the system than the maximum power required by the system.

Figure 3:
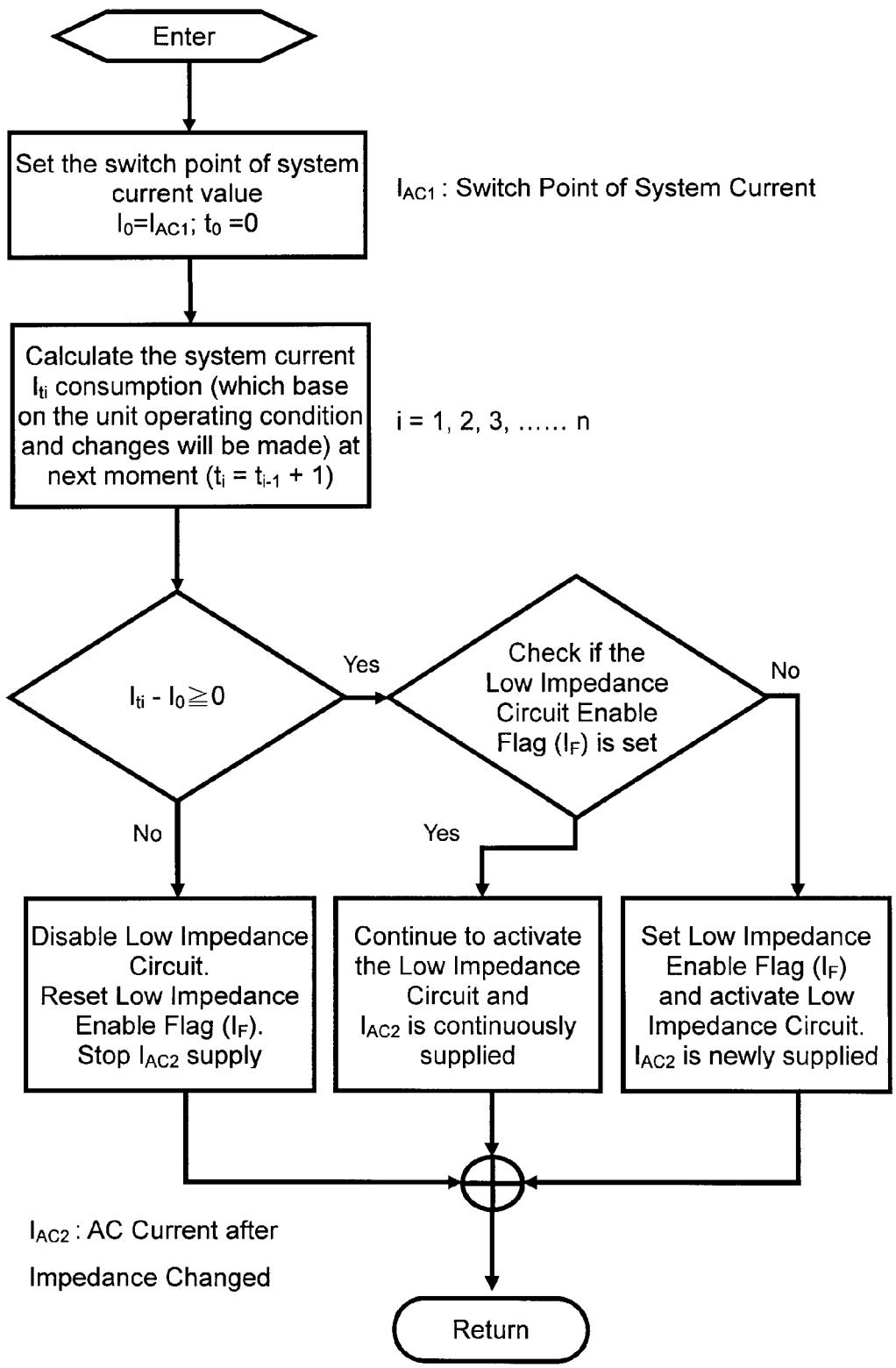
FIG. 3 is a flow chart diagram illustrating the operation of the power saving system depicted in FIG. 1.

FIG. 3 is a flow chart diagram illustrating the more detailed operation of the power saving system. First, the signal processing unit 5 sets a switch point of the system current value $I_0 = I_{AC1}$ and sets a time point $t_0$. Then the system calculates the current $I_{ti}$, which is the current that the household electric appliance needs to run at the next moment at $t_i = t_{i-1} + 1$, where $i = 1, 2, 3, \ldots, n$. Next, the system determines whether $I_{ti} - I_0 \geq 0$. If so, it means the current demanded by the system at the next moment is equal to or greater than the switch point current $I_0 = I_{AC1}$; otherwise, the current demanded by the system at the next moment is less than the switch point current $I_0 = I_{AC1}$.

In the case of $I_{ti} - I_0 \geq 0$, the signal processing unit 5 checks if an impedance control circuit enable flag $I_F$ is set to a predetermined value, in this embodiment "1". In this embodiment, the impedance control circuit enable flag $I_F$ represents the status of the impedance control switch 7. If the flag $I_F$ is turned on, i.e. $I_F = 1$, it means the impedance control switch 7 is turned on so that the low impedance circuit 2 is activated and $I_{AC2}$ is being supplied to the household electric appliance. Since a current greater than or equal to $I_0$ is needed at the next moment, the system is configured to continue to activate the conversion impedance control circuit 2 and supply the current $I_{AC2}$ to the household electric appliance. If the flag $I_F$, however, is turned off, i.e. $I_F = 0$, it means the impedance control switch 7 is turned off so that the low impedance circuit 2 is not activated and $I_{AC2}$ is not being supplied to the household electric appliance. Since a current greater than or equal to $I_0$ is needed at the next moment, the signal processing unit 5 is configured to turn on the impedance control switch 7 and the flag $I_F$, activate the conversion impedance control circuit 2 and supply the current $I_{AC2}$ to the household electric appliance.

In the case of $I_{ti} - I_0 < 0$, since a supply current less than $I_0$ is needed at the next moment, which means $I_0$ is sufficient for the household electric appliance to work properly at the next moment, the system is configured to deactivate the conversion impedance control circuit 2, turn off the impedance control switch 7 and the impedance control circuit enable flag $I_F$, and cut off the $I_{AC2}$.

While the present patent application has been shown and described with particular references to a number of embodiments thereof, it should be noted that various other changes or modifications may be made without departing from the scope of the present invention.

What is claimed is:

1. A power saving system for a household electric appliance comprising: a signal processing unit;
   a step down network having an adjustable impedance for stepping down an input voltage; and
   an impedance control switch electrically connected with the step down network and configured for controlling the impedance of the step down network; wherein: the signal processing unit is electrically connected to impedance control switch and configured to monitor the working condition of the household electric appliance, calculate the current demanded by the household electric appliance at a next moment, and transmit a signal to the impedance control switch so as to control the impedance control switch to adjust the impedance of the step down network according to the calculation;

the step down network comprises a voltage step down circuit and a conversion impedance control circuit, the voltage step down circuit being connected with the conversion impedance control circuit in parallel through the impedance control switch, the voltage step down circuit comprises a first resistor, a second resistor and a first capacitor, the first resistor being connected with the first capacitor in parallel and connected with the second resistor in series.

2. The power saving system of claim 1, wherein the conversion impedance control circuit comprises a third resistor, a fourth resistor and a second capacitor, the third resistor being connected with the second capacitor in parallel and connected with the fourth resistor in series.

3. The power saving system of claim 1, wherein the impedance control switch is configured to be turned on to connect the voltage step down circuit and the conversion impedance control circuit in parallel, and to be turned off to disconnect the voltage step down circuit and the conversion impedance control circuit, so as to adjust the impedance of the step down network.

4. The power saving system of claim 1, wherein the impedance control switch is an electromechanical switch or a semiconductor power device.

5. The power saving system of claim 1, wherein the signal processing unit is configured to set a switch point current value, judge whether the current demanded by the household electric appliance at the next moment is equal to or greater than the switch point current value, and adjust the impedance of the step down network according to the judgment.

6. The power saving system of claim 5, wherein the signal processing unit is configured to turn on the impedance control switch so as to adjust the step down network to have a relatively low impedance when the current demanded by the household electric appliance at the next moment is equal to or greater than the switch point current value, and to turn off the switch so as to adjust the step down network to have a relatively high impedance when the current demanded by the household electric appliance at the next moment is less than the switch point current value.

7. The power saving system of claim 1, wherein the signal processing unit is configured to set a flag value after adjusting the impedance of the step down network, and to read the flag value before adjusting the impedance of the step down network.

8. A power saving system for a household electric appliance comprising:
a signal processing unit;
a step down network for stepping down an input voltage, the step down network having two current paths for providing current to the household electric appliance; and a current control switch electrically connected with the step down network and configured for selectively enabling the current paths in the step down network;

wherein:
the signal processing unit is electrically connected to current control switch and configured to monitor the working condition of the household electric appliance, calculate the current demanded by the household electric appliance at a next moment, and transmit a signal to the current control switch so that the current paths are selectively enabled by the current control switch according to the calculation;

the step down network comprises a first current path and a second current path, the first current path being connected with the second current path in parallel through the current control switch; the first current path comprises a first resistor, a second resistor and a first capacitor, the first resistor being connected with the first capacitor in parallel and connected with the second resistor in series.

9. The power saving system of claim 8, wherein the second current path comprises a third resistor, a fourth resistor and a second capacitor, the third resistor being connected with the second capacitor in parallel and connected with the fourth resistor in series.

10. The power saving system of claim 8, wherein the current control switch is configured to be turned on to enable both the first current path and the second current path to provide current to the household electric appliance, and to be turned off to enable only the first current path to provide current to the household electric appliance.

11. The power saving system of claim 8, wherein the current control switch is an electromechanical switch or a semiconductor power device.

12. The power saving system of claim 8, wherein the signal processing unit is configured to set a switch point current value, to judge whether the current demanded by the household electric appliance at the next moment is equal to or greater than the switch point current value, and to selectively enable the current paths according to the judgment.

13. The power saving system of claim 12, wherein the signal processing unit is configured to turn on the current control switch so as to enable both of the two current paths when the current demanded by the household electric appliance at the next moment is equal to or greater than the switch point current value, and to turn off the switch so as to enable only the first current path when the current demanded by the household electric appliance at the next moment is less than the switch point current value.

14. The power saving system of claim 8, wherein the signal processing unit is configured to set a flag value after selectively enabling the current paths, and to read the flag value before selectively enabling the current paths.

* * * * *